United States Patent
Hiraguchi

(10) Patent No.: US 7,021,580 B2
(45) Date of Patent: Apr. 4, 2006

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/601,768

(22) Filed: Jun. 24, 2003

(65) Prior Publication Data

US 2004/0050991 A1    Mar. 18, 2004

(30) Foreign Application Priority Data

Jun. 24, 2002    (JP)    ............................ 2002-182381

(51) Int. Cl.
 *G11B 23/07*    (2006.01)
(52) U.S. Cl. .................... 242/348.2; 360/132
(58) Field of Classification Search ............... 242/348, 242/348.2; 360/132
See application file for complete search history.

(56) References Cited

U.S. PATENT DOCUMENTS

| 3,861,611 | A | 1/1975 | Esashi et al. |
| 5,706,146 | A | 1/1998 | Ono et al. |
| 6,349,892 | B1 | 2/2002 | Morita et al. |
| 6,435,439 | B1 | 8/2002 | Ishihara et al. |
| 6,581,865 | B1 * | 6/2003 | Zweighaft et al. ......... 242/348 |
| 6,764,037 | B1 | 7/2004 | Hancock et al. |
| 2003/0080228 | A1 | 5/2003 | Hiraguchi et al. |
| 2003/0094528 | A1 | 5/2003 | Hiraguchi |
| 2003/0094530 | A1 | 5/2003 | Hiraguchi |
| 2003/0178519 | A1 * | 9/2003 | Hancock et al. ............ 242/348 |
| 2003/0234308 | A1 | 12/2003 | Hiraguchi |
| 2003/0234309 | A1 | 12/2003 | Hiraguchi |
| 2004/0011909 | A1 | 1/2004 | Ishihara |
| 2004/0041053 | A1 | 3/2004 | Iino |
| 2004/0061016 | A1 | 4/2004 | Morita et al. |
| 2004/0061017 | A1 | 4/2004 | Hiraguchi |
| 2004/0089757 | A1 | 5/2004 | Ishihara |

FOREIGN PATENT DOCUMENTS

| JP | 2000-076821 A | 3/2000 |
| JP | 2001-148179 A | 5/2001 |

* cited by examiner

*Primary Examiner*—John Q. Nguyen
(74) *Attorney, Agent, or Firm*—Sughrue Mion, PLLC

(57) ABSTRACT

In a recording tape cartridge, an opening is formed at a corner portion between wall portions which are at a front and a side with respect to a direction of loading, into a drive device, a substantially rectangular case accommodating a reel on which a recording tape is wound. The opening is inclined with respect to the direction of loading. A leader member attached to an end portion of the recording tape is pulled-out from the opening. A door, which is formed in an arc-shape and opens and closes the opening, is disposed at the opening so as to be slidable along a predetermined, arc-shaped guide groove. A width of the groove is formed so as to narrow along a direction in which the door closes the opening. Opening and closing operations of the door are thereby stabilized.

14 Claims, 9 Drawing Sheets

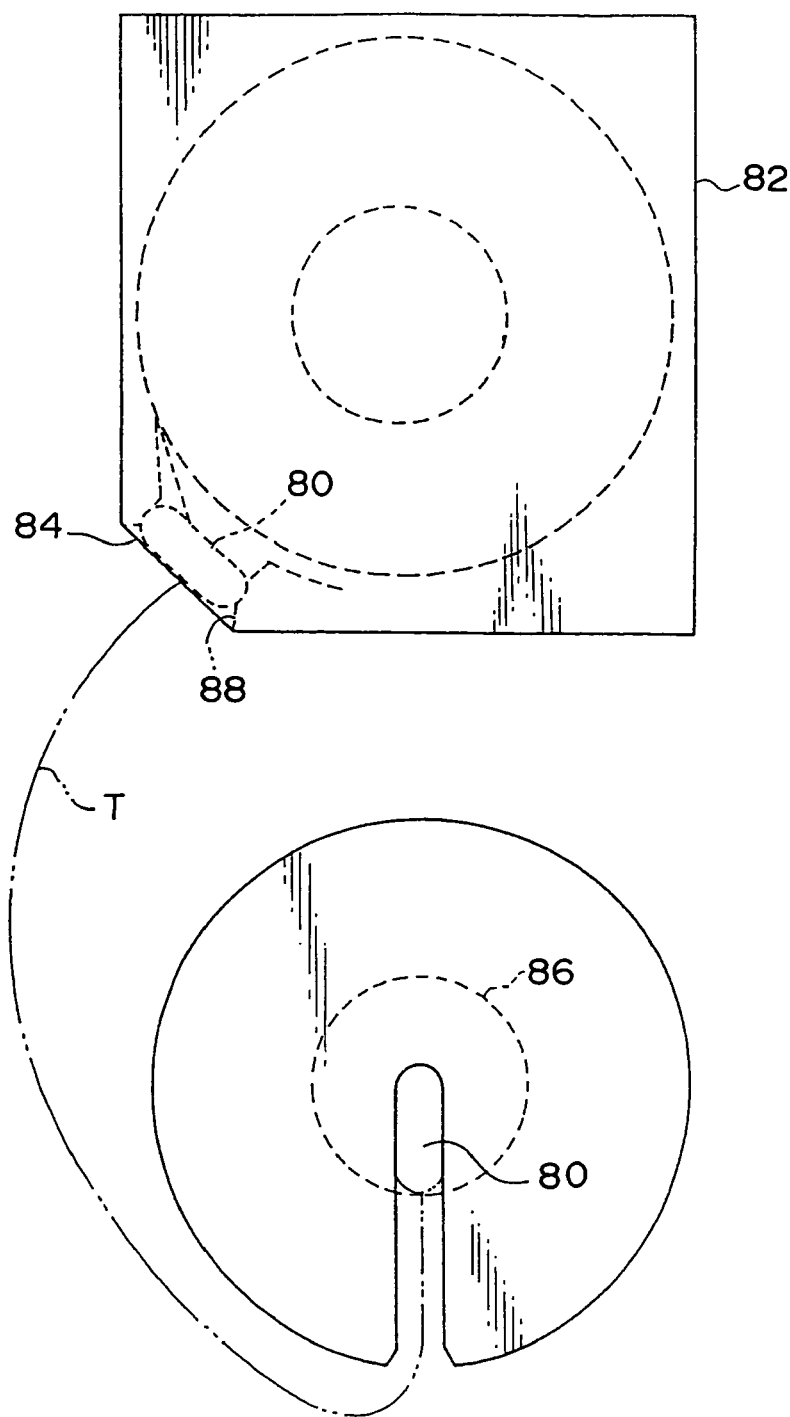

RECORDING TAPE CARTRIDGE

CROSS-REFERENCE TO RELATED APPLICATION

This application claims priority under 35 USC 119 from Japanese patent Application No. 2002-182381, the disclosure of which is incorporated by reference herein.

BACKGROUND OF THE INVENTION

1. Field of the Invention

The present invention relates to a recording tape cartridge accommodating, within a case, a single reel on which is wound a recording tape, such as a magnetic tape or the like, which is used as a recording/playback medium mainly in computers or the like.

2. Description of the Related Art

Conventionally, magnetic tape cartridges have been known in which a magnetic tape, which is used as a data recording/playback medium of a computer or the like, is wound on a single reel, and the reel is accommodated in a case. A leader member, such as a leader pin, a leader tape, or a leader block, is provided at the distal end of the magnetic tape. A pull-out mechanism provided at a drive device pulls the leader member out from an opening of the magnetic tape cartridge, and winds the magnetic tape fixed thereto onto a take-up reel of the drive device.

An open hole is formed in the bottom surface of the magnetic tape cartridge. A reel gear is formed in an annular form in the center of the bottom surface of the reel which emerges from the open hole. Due to a driving gear, which is provided at a rotating shaft of the drive device, meshing with this reel gear, the reel is driven to rotate. By driving the reel of the magnetic tape cartridge and the take-up reel of the drive device synchronously, data can be recorded onto the magnetic tape, and data recorded on the magnetic tape can be played back.

Such a magnetic tape cartridge requires little space for storage thereof, and a large amount of information can be recorded thereon. As shown in FIGS. 7 through 9, the position of the opening and the type of the door which opens and closes the opening differ for each type of leader member. Namely, in the case of a leader pin 60, as shown in FIG. 7, an opening 68 is formed in a side wall 64 of a case 62 which side wall 64 is parallel to the direction of loading the magnetic tape cartridge into a drive device (the direction of arrow P). The opening 68 is opened and closed by a door 66 which slides in the same direction as the loading direction.

However, when the opening 68 is provided at the side wall 64 of the case 62 in this way, the pull-out mechanism of the drive device must pull-out the leader pin 60 by circling around from the left-right (lateral) direction of the case 62. Thus, space for pull-out mechanism to circle around must be ensured at the drive device, the mechanism for making the pull-out mechanism circle around is complex, and a drawback arises in that the drive device becomes large. Further, there is also the problem that the pull-out path of a magnetic tape T becomes long.

Moreover, in the case of a leader tape 70, as shown in FIG. 8, an opening 78 is formed in a front wall 74 of a case 72 which front wall 74 is perpendicular to the direction of loading the magnetic tape cartridge into a drive device (the direction of arrow P). A door 76 which opens and closes the opening is a rotatable-type door which rotates forward around a supporting shaft 75 supported in a vicinity of a corner portion of the case 72. However, when the opening 78 is provided at the front wall 74 of the case 72 in this way, although there is no need for the pull-out mechanism of the drive device to circle around, the door 76 opens widely toward the front. Therefore, space must be ensured at the drive device so that nothing interferes with the door 76 at the time when the door 76 opens the opening 78, and a drawback arises in that the drive device becomes large.

Moreover, in the case of a leader block 80, as shown in FIG. 9, an opening 88 is formed by obliquely cutting off a corner portion 84 at a front side in the direction of loading the magnetic tape cartridge into a drive device. The opening 88 is directly opened and closed by the leader block 80. However, when the leader block 80 opens and closes the opening 88 in this way, there is the problem that it is easy for the leader block 80 to become dirtied or scratched. Namely, the leader block 80 fits into a reel hub 86 of the drive device, and forms a portion of the reel hub 86. Therefore, there is the concern that, even if the leader block 80 is dirtied or scratched to the extent that does not cause problems when the leader block 80 is normally used as the door, it may become difficult for the leader block 80 to fit together with the reel hub 86, and problems in the conveying of the magnetic tape T may arise.

In addition, the leader block 80 is merely anchored at the edge portion of the opening 88. Thus, when the magnetic tape cartridge is dropped, there is the problem that the leader block 80 can easily come out from the magnetic tape cartridge. Further, because the leader block 80 is larger than the leader pin 60, there is the problem that there are more constraints on the configuration of the case. Thus, a leader pin 60, whose function is separate from that of a door, is superior to the leader block 80 which functions as a door as well.

SUMMARY OF THE INVENTION

An object of the present invention is to provide a recording tape cartridge in which a door, which opens and closes an opening, and a leader member for pulling-out of a recording tape are separate members, and which has an opening which enables a pull-out path of the recording tape to be the shortest, and has a sliding-type door which can open and close the opening in a small space, and which makes it possible to make drive devices more compact.

In order to achieve the above-described object, a first aspect of the present invention is a recording tape cartridge which is loaded into a drive device from a predetermined loading direction for use, the recording tape cartridge comprising: a case rotatably accommodating a single reel on which a recording tape is wound, the case having a front wall at a front side thereof in the loading direction and a side wall running along the loading direction, and having a corner portion between the front wall and the side wall, an opening for pulling-out of the recording tape from one end portion of the recording tape being formed at said corner portion; and a shielding member, disposed within the case so as to be slidable along a predetermined locus, for opening and closing the opening by sliding.

The corner portion may have a surface which is inclined with respect to both the front wall and the side wall, and the opening is formed at that surface. The case has an upper plate and a lower plate, each of which is substantially rectangular and has an inner surface, and the case has wall portions including the front wall and the side wall which join together the upper plate and the lower plate such that a space for accommodating the reel is formed between the inner surfaces of the upper plate and the lower plate, and the opening is formed in the wall portions of the upper plate and the lower plate which wall portions are associated with one corner. The recording tape may have a leader member which is attached to an end portion of the recording tape and which is pulled-out to the drive device.

The shielding member has an opening/closing plate which is curved in a substantial arc-shape having one radius. The predetermined locus is a substantial arc-shape having one radius, and a radius of the opening/closing plate substantially coincides with the radius of the predetermined locus.

A groove is formed at an interior of the case, and the predetermined locus is formed thereby. At least one portion of the shielding member is positioned and guided in the groove. At least one portion of the groove is formed by opposing walls. The groove has at least two portions having different widths, and a portion of the groove which is at a downstream side in a direction in which the shielding member closes the opening has a groove width which is more narrow than a portion of the groove which is at an upstream side.

Namely, the recording tape cartridge has a substantially rectangular case rotatably accommodating a single reel on which a recording tape is wound; an opening formed by cutting a corner portion of the case which corner portion is at a side in a direction of loading the case into a drive device, the opening being for pulling-out of a leader member attached to an end portion of the recording tape; a shielding member provided within the case, and formed in a substantial arc-shape in plan view, and opening and closing the opening by moving on a predetermined circumference; and a guide groove provided at an inner surface of the case such that a width of the guide groove narrows along a direction in which the shielding member closes the opening, the guide groove guiding movement of the shielding member.

In this way, when the opening is provided by cutting a corner portion of the case at the side in the direction of loading the case into a drive device, the plane of opening of the opening can face in the direction of loading into the drive device. Thus, the pull-out mechanism of the drive device can enter in from the front side, and the path along which the recording tape is pulled-out can be made to be the shortest. Accordingly, there is no need at the drive device for a complex mechanism for making the recording tape circle around, and a drive device which is compact and has a low manufacturing cost can be designed. Moreover, because the recording tape travels along the shortest path, wear of the recording tape due to contact with a tape guide can be reduced.

The guide groove which guides the shielding member is provided at the inner surface of the case such that the width thereof narrows along the direction in which the shielding member closes the opening, or in other words, the width thereof widens along the direction in which the shielding member opens the opening. Thus, even if there is dispersion due to molding in the curvature of the shielding member which is formed in a substantial arc-shape in plan view, the shielding member can be reliably assembled into the case. Further, because the guide groove is formed such that the width thereof narrows along the direction in which the shielding member closes the opening, joggling of the shielding member at the time when the shielding member closes the opening is suppressed.

The width of the guide groove narrowing along the direction in which the shielding member closes the opening means both a case in which the mutually-opposing guide surfaces of the guide walls forming the guide grooves gradually approach one another such that the interval therebetween continuously narrows, and a case in which the interval therebetween is narrowed in a stepwise manner at predetermined places while the parallel state of the mutually-opposing guide surfaces is maintained. In particular, this encompasses all cases in which the interval (groove width) of the portion of the guide groove which is exposed at the opening is more narrow than the interval (groove width) of the other portions of the guide groove.

BRIEF DESCRIPTION OF THE DRAWINGS

FIG. 9 is a schematic plan view of a conventional magnetic tape cartridge equipped with a leader block.

DETAILED DESCRIPTION OF THE INVENTION

Hereinafter, a recording tape cartridge 10 relating to an embodiment of the present invention will be described on the basis of FIGS. 1 through 6. First, the overall structure of the recording tape cartridge 10 will be described briefly, and then the main portions relating to the present invention will be described in detail. Note that, for convenience of explanation, the direction of loading the recording tape cartridge 10 into a drive device is denoted by arrow A, and this direction of arrow A is the forward direction (front side of the recording tape cartridge 10). The direction of arrow B, which is orthogonal to the direction of arrow A, is the rightward direction.

Figure 1:
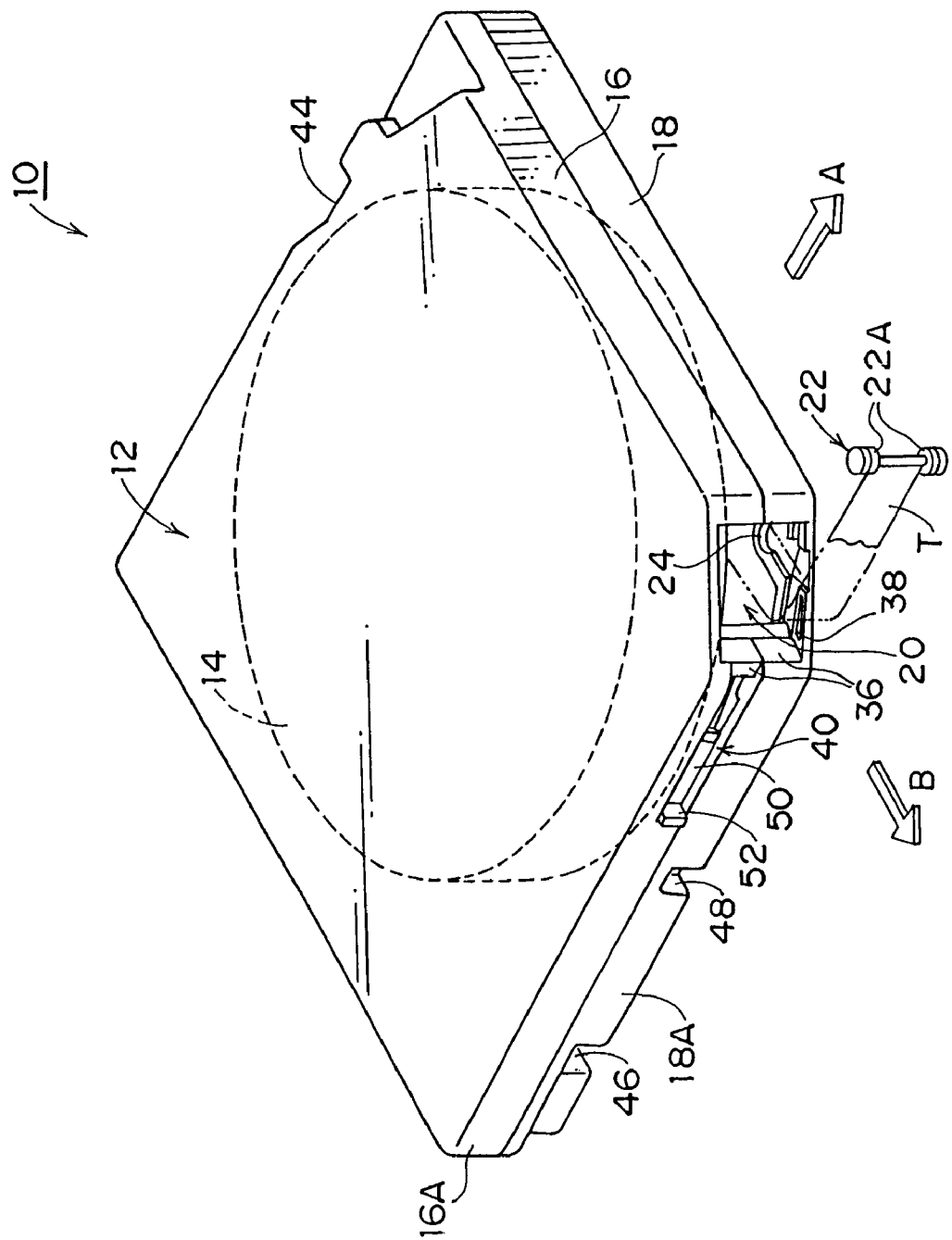
FIG. 1 is a schematic perspective view of a recording tape cartridge relating to an embodiment of the present invention.
Figure 2:
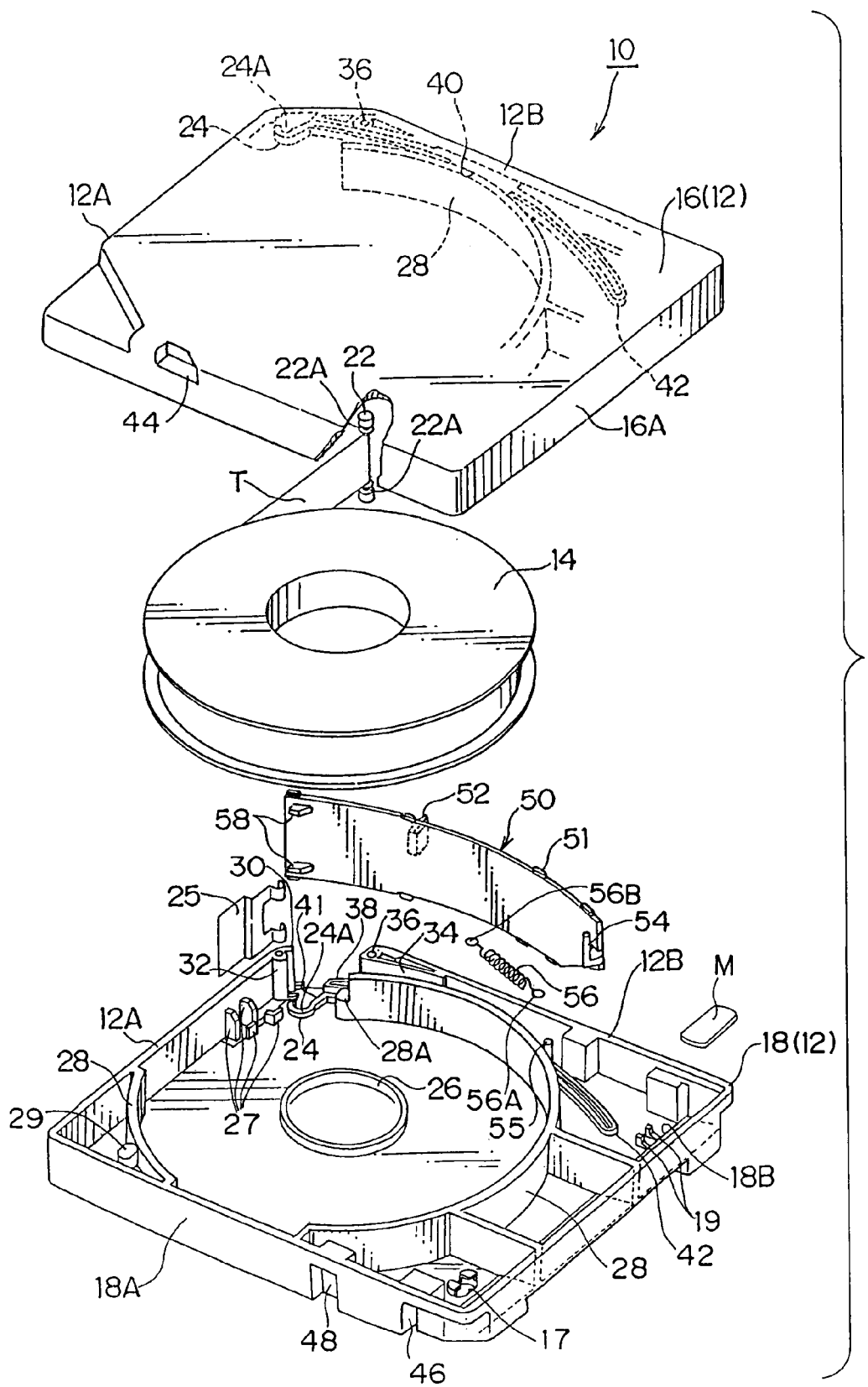
FIG. 2 is a schematic exploded perspective view of the recording tape cartridge relating to the embodiment of the present invention.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is substantially rectangular as seen in plan view. The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut off. A space for accommodating the reel 14, on which the magnetic tape T is wound, is provided at the interior of the case 12.

Further, the corner portion of the upper case 16 and the lower case 18, at which corner portion the peripheral walls 16A, 18A have been cut, forms an opening 20 for pulling-out of the magnetic tape T. A leader pin 22, which is pulled-out while being anchored (engaged) by a pull-out mechanism of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out mechanism. In this way, the hooks or the like do not contact and scratch the magnetic tape T at the time of pulling-out the magnetic tape T.

Figure 3:
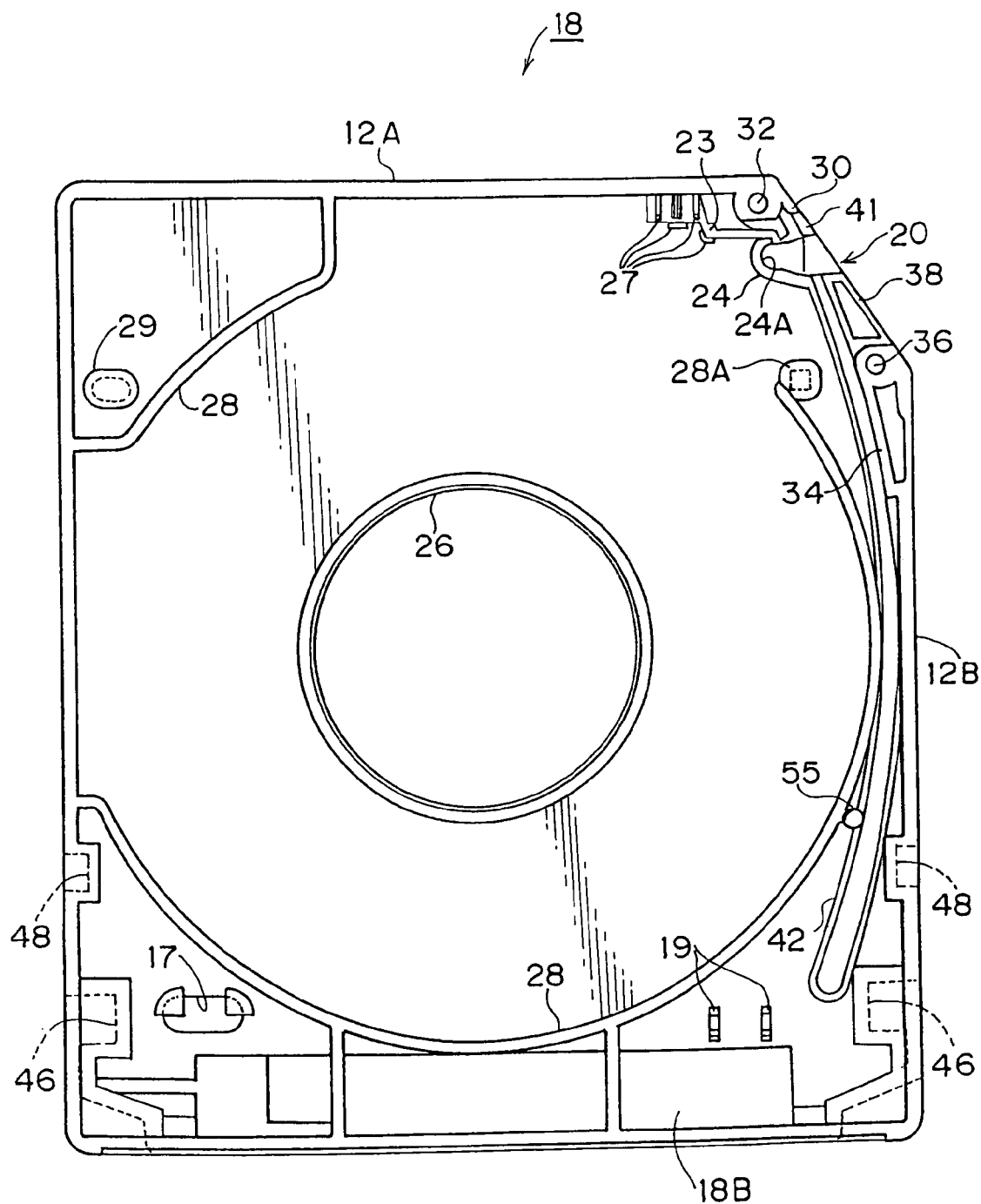
FIG. 3 is a schematic plan view of a lower case of the recording tape cartridge relating to the embodiment of the present invention.
Figure 4:
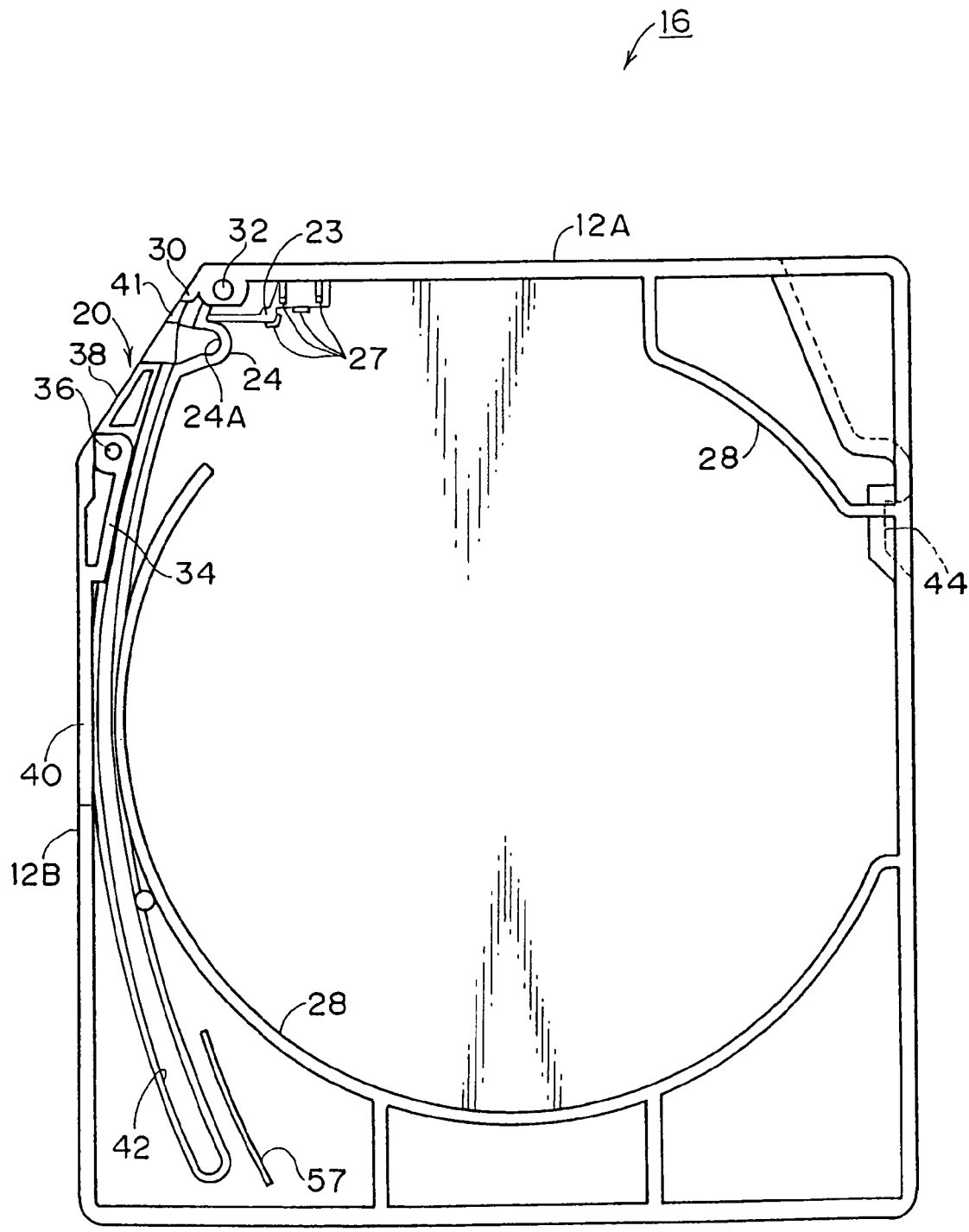
FIG. 4 is a schematic plan view of an upper case of the recording tape cartridge relating to the embodiment of the present invention.

A pair of upper and lower pin holding portions 24, which position and hold the leader pin 22 within the case 12, are provided at the inner side of the opening 20 of the case 12. As shown in FIGS. 3 and 4 as well, the pin holding portions 24 are formed in substantially semicylindrical shapes. The both end portions of the leader pin 22, which is in a state of standing upright, are held in concave portions 24A of the pin holding portions 24. The magnetic tape T pull-out sides of the outer peripheral walls of the pin holding portions 24 are open, so as to form an entrance/exit into and from which the leader pin 22 can enter and exit.

In vicinities of the pin holding portions 24, a proximal portion of an anchor spring 25 is inserted and fixed in spring holding portions 27 and groove portions 23 (see FIGS. 3 and 4) which are provided at the inner surface of the front wall 12A. (The front wall 12A is the portions of the peripheral walls 16A, 18A where the outer surfaces thereof face in the direction of arrow A.) The distal ends of the anchor spring 25, which have been divided so as to be forked in two, engage the upper and lower ends of the leader pin 22 and hold the leader pin 22 in the pin holding portions 24. When the leader pin 22 enters into and exits from the pin holding portions 24, the distal end portions of the anchor spring 25 elastically deform appropriately so as to permit movement of the leader pin 22.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not shift (so as to not joggle) by play restricting walls 28 which project out at portions of the inner surfaces of the upper case 16 and the lower case 18, and which serve as inner walls which are on a circular locus which is coaxial with the gear opening 26.

A bag portion (concave portions) 28A, in which a hole for position regulation is formed, is provided so as to be continuous with the end portion of the play restricting wall 28 in a vicinity of the opening 20. Further, a bag portion 29, in which is formed a hole for position regulation which is a long hole, is provided so as to be set apart from the play restricting wall 28 at the inner side of the front left corner portion of the case 12. The bag portions 28A, 29 are disposed on a single straight line which extends along the direction of arrow B. The end portions of the play restricting walls 28, except for the end portion thereof at which the bag portion 28A is continuous, are continuous with (are provided so as to be connected to) the peripheral wall 16A or the peripheral wall 18A of the case 12, so as to partition the outer sides of the play restricting walls 28 and the space at which the reel 14 is set.

A memory board M, which stores various types of information, is set at the rear right portion of the lower case 18 for each recording tape cartridge 10. A rear portion inner wall 18B is formed at an inclined surface of a predetermined angle and the memory board M is supported by supporting projections 19 and disposed so as to be inclined at a predetermined angle, such that sensing is possible at a drive device which reads the information from the bottom surface side and at a library device which reads the information from the rear wall side. Further, a write protect tab (not illustrated), which is set so that recording onto the recording tape cartridge 10 is possible or is not possible, is provided at the left rear portion of the lower case 18. An open hole 17, from which an recognition portion (not illustrated) for write protection, is formed in the left rear portion of the lower case 18.

A pair of upper and lower short, inclined wall portions 30, which prescribe the front edge portion of the opening 20, are provided at the right end portion of the front wall 12A of the case 12. The inclined wall portions 30 are bent along the plane of opening of the opening 20. Due to the distal end of a door 50, which is substantially arc-shaped in plan view and which will be described later, entering in at the inner sides of the inclined wall portions 30 when the opening 20 is closed, the inclined wall portions 30 serve as dustproofing walls such that no gap through which dust or the like may enter arises. Further, a pair of upper and lower screw bosses 32 are connectedly provided so as to be continuous with the inner side of the front wall 12A in a vicinity of the left side of the inclined wall portions 30.

On the other hand, a pair of upper and lower inclined wall portions 34, which are shaped, in plan view, so as to substantially run along the outer peripheral surface of a door 50 which will be described later, are provided at the inner side of the front end portion of a right wall 12B of the case 12. (The right wall 12B is the portions of the peripheral walls 16A, 18A where the outer surfaces thereof face in the direction of arrow B.) The front end surfaces of the inclined wall portions 34 prescribe the rear edge of the opening 20. A pair of upper and lower screw bosses 36 are provided at the front end portions of the inclined wall portions 34.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting out the lower portion of the front side of the peripheral wall 16A of the upper case 16 which forms the right wall 12B. The slit 40 opens toward the opening 20 side as well. It is preferable to form the slit 40 by leaving a portion of the peripheral wall 16A at the upper side thereof because the rigidity of the case 12 can be maintained. In particular, it is more preferable that the upper side wall prescribing the slit 40 be integral and continuous with the inclined wall portion 34.

A concave portion 48 is formed at the rear side of the lower case 18. The portion of the concave portion 48, other than the upper end of the peripheral wall 18A, is recessed toward the inner side of the case 12 in a substantially U-shaped configuration in cross-sectional view, and is recessed upwardly from the bottom surface of the case 12 as well (the bottom plate is notched). The concave portion 48 is formed in the left wall of the case 12 as well. The concave portions 48 are engagement portions which, for example, a pull-in mechanism of a drive device engages. The bottom surfaces (downwardly-facing surfaces) thereof are reference surfaces for positioning within the drive device.

Further, a concave portion 46 is formed at the rear side of the concave portion 48. The portion of the concave portion 46, other than the upper end of the peripheral wall 18A, is recessed toward the inner side of the case 12 in a sideways, substantially U-shaped configuration as seen in a cross-sectional view, and is recessed upwardly from the bottom surface of the case 12 as well (i.e., the bottom plate is notched). The concave portions 46 are engagement portions which a grasping mechanism of a library device engages. By providing the concave portions 46, 48, the strength of the case 12 (the lower case 18) with respect to twisting is improved. Moreover, a concave portion 44, which is substantially trapezoidal as seen in plan view, is formed in the top surface portion of the left wall of the upper case 16. This concave portion 44 is an engagement portion which is engaged by a holding member (not shown) for canceling the rotation (moment) accompanying the movement of the door 50 in the direction of opening at the time of opening the opening 20.

Guide wall portions 42 of predetermined heights (e.g., about 1.0 mm to 1.5 mm) stand erect at the upper case 16 and the lower case 18. The guide wall portions 42 support convex portions 51 of the door 50 which will be described later, so as to sandwich the convex portions 51 from both the inner surface side and the outer surface side thereof, from the vicinity of the opening 20 to a vicinity of the region where the play restricting walls 28 are closest to the right wall 12B (hereinafter called the front half), and from a vicinity of the rear end of the slit 40 to a vicinity of the rear wall (hereinafter called the rear half).

The guide wall portions 42 are formed in substantial arc-shapes in plan view. The lengths of the guide wall portions 42 are different at the upper case 16 and the lower case 18. The guide wall portion 42 at the upper case 16 side is formed such that the rear half thereof is longer than that of the guide wall portion 42 at the lower case 18 side. This is because the memory board M is disposed so as to be inclined at a predetermined angle at the right wall 12B side of the rear portion inner wall 18B of the lower case 18.

Figure 5:
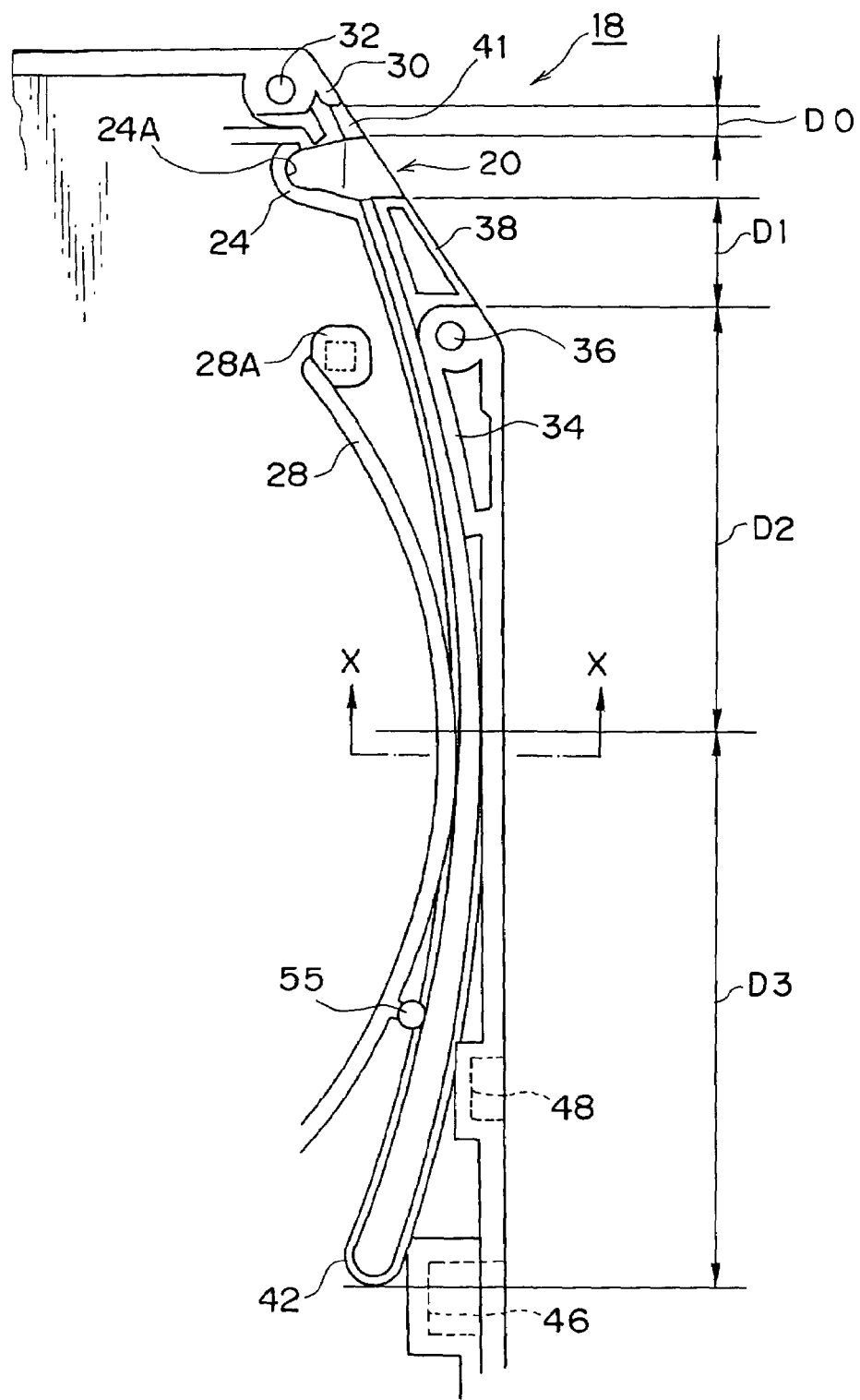
FIG. 5 is a schematic enlarged plan view showing a guide wall portion of the lower case of the recording tape cartridge relating to the embodiment of the present invention.

As shown in FIG. 5, the interval (groove width) of the guide wall portion 42 is formed so as to narrow along the direction in which the door 50 closes the opening, or in other words, to continuously (gradually) become wider from the front end portion of the front half of the guide wall portion 42 to the rear end portion of the rear half of the guide wall portion 42. Namely, the average value of the clearance between, for example, the side surface of the convex portion 51 of the door 50 (the side surface including a projection which will be described later) and the inner surface of the guide wall portion 42 (the guide surface) is 0.1 mm at one side at a region D1 exposed from the opening 20, and is 0.2 mm at one side at a front half region D2 except for the region D1, and is 0.4 mm at one side at a rear half region D3.

In this way, when the clearance between the convex portion 51 of the door 50 and the guide wall portion 42 is formed so as to widen along the direction in which the door 50 opens the opening 20, even if there is dispersion in the curvature of the door 50 due to molding, the convex portions 51 of the door 50 can be reliably inserted within the guide wall portions 42. Note that the guide wall portion 42 does not have to be formed such that the interval thereof (the clearance with the convex portions 51) varies continuously as illustrated. The guide wall portion 42 may be formed such that the clearance with the convex portions 51 varies in a stepwise manner at predetermined places, such as 0.1 mm at one side at region D1, 0.2 mm at one side at region D2, and 0.4 mm at one side at region D3.

Moreover, the rear end portions of the rear halves of the guide wall portions 42 are closed in substantial arc-shapes as seen in plan view so as to restrict the rearward most convex portions 51 at the top and the bottom such that the door 50 cannot move any further rearward. Moreover, the front end portions of the front halves of the guide wall portions 42 are open, and extend to positions at which they do not impede entry and exit of the leader pin 22 at the time the leader pin 22 enters and exits. (In the illustrated structure, the front end portions of the front halves of the guide wall portions 42 extend to about half of the opening width of the opening 20, at the rear sides of the pin holding portions 24.)

Guide wall portions 41, whose rear end portions are open, stand erect in vicinities of the inclined wall portions 30 so as to be positioned on imaginary lines extending from the guide wall portions 42. The rear end portions of the guide wall portions 41 do not extend further rearward of the front ends of the pin holding portions 24, so as to not impede the entry and exit of the leader pin 22. The interval (groove width) of the guide wall portions 41 is formed so as to, together with the above-described guide wall portions 42, become more narrow in the direction in which the door 50 closes the opening 20. Namely, at the region D0 of the guide wall portion 41, the interval (groove width) is formed to be the same as the interval (groove width) at the front end portion (the region D1 portion) of the front half of the guide wall portion 42, or is formed so as to be slightly more narrow than the interval (groove width) at the front end portion of the front half of the guide wall portion 42 (i.e., so as to be the same as the width of the convex portion 51 including the projections).

Namely, as described above, the interval (groove width) at the rear half side of the guide wall portion 42 is wider than the interval (groove width) at the front half side of the guide wall portion 42, so as to permit dispersion in molding of the door 50 (dispersion in curvature). The convex portions 51 of the door 50 slide within the guide wall portions 42 in a state in which there is a certain amount of joggling. Accordingly, the interval (groove width) of the guide wall portion 41 (the region D0 portion) and the interval (groove width) of the guide wall portion 42 at the region D1 portion are substantially the same as the width of the convex portions 51 of the door 50 (including the projections). When the opening 20 is closed, the door 50 can be held without joggling by fitting the front most convex portions 51 into the region D1 portions of the guide wall portions 42, and preferably into the guide wall portions 41 (in the region D0).

Further, the guide wall portions 41 and the front halves of the guide wall portions 42 are formed to be slightly shorter heights than the rear halves of the guide wall portions 42. Namely, for example, the heights of the guide wall portions 41 and the front halves of the guide wall portions 42 are about 1 mm, whereas the heights of the rear halves of the guide wall portions 42 are 1.5 mm. This is in order to ensure space for entry of the pull-out mechanism of the drive device which engages and pulls out the leader pin 22. Accordingly, as will be described later, the plate width (height) of the door 50 at the front half portion thereof (at least the portion of the door 50 which closes the opening 20), is wider (taller) by an amount corresponding to the amount by which the guide wall portions 41 and the front halves of the guide wall portions 42 are shorter.

Figure 6:
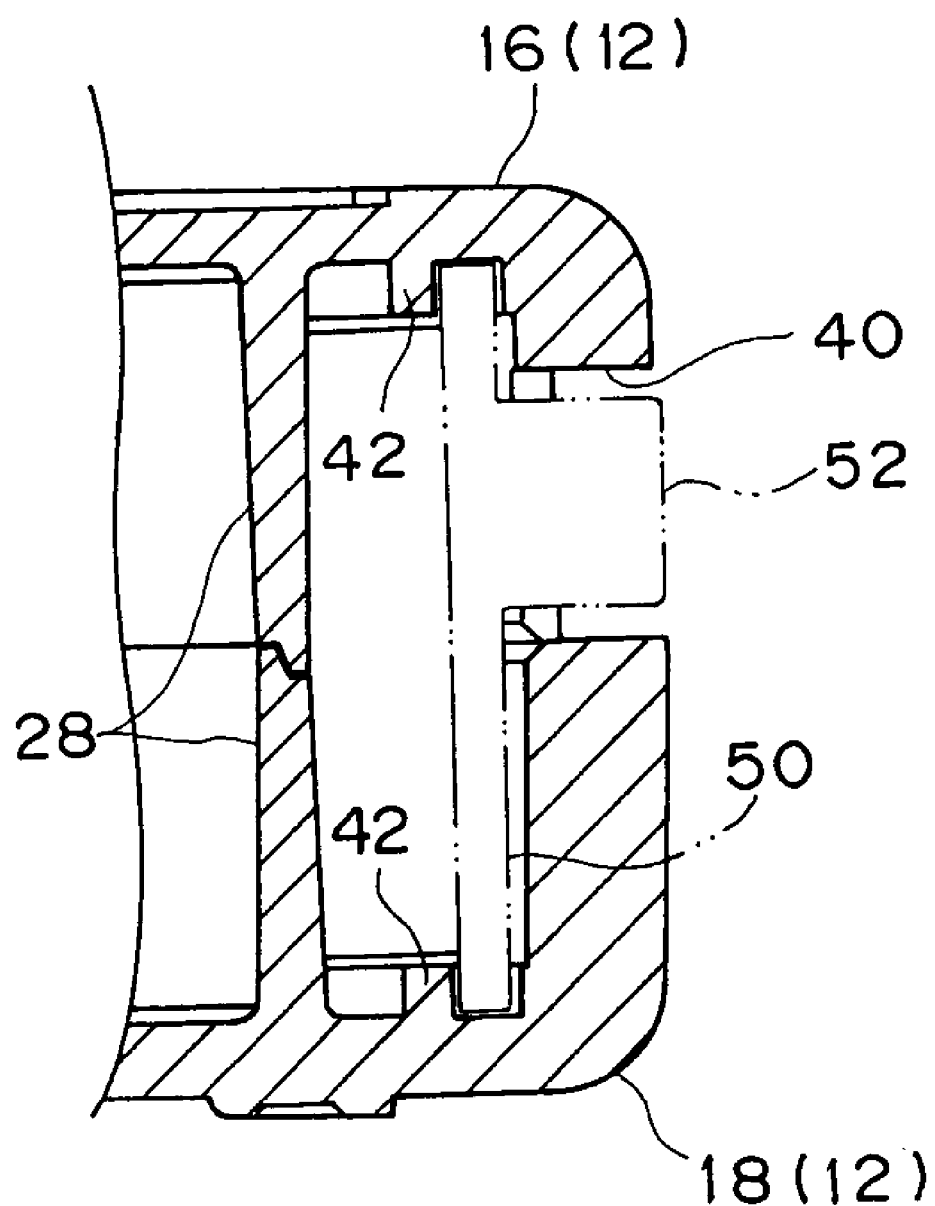
FIG. 6 is a schematic sectional view seen in the direction of the arrows of line X—X of the lower case of the recording tape cartridge shown in FIG. 5.
Figure 7:
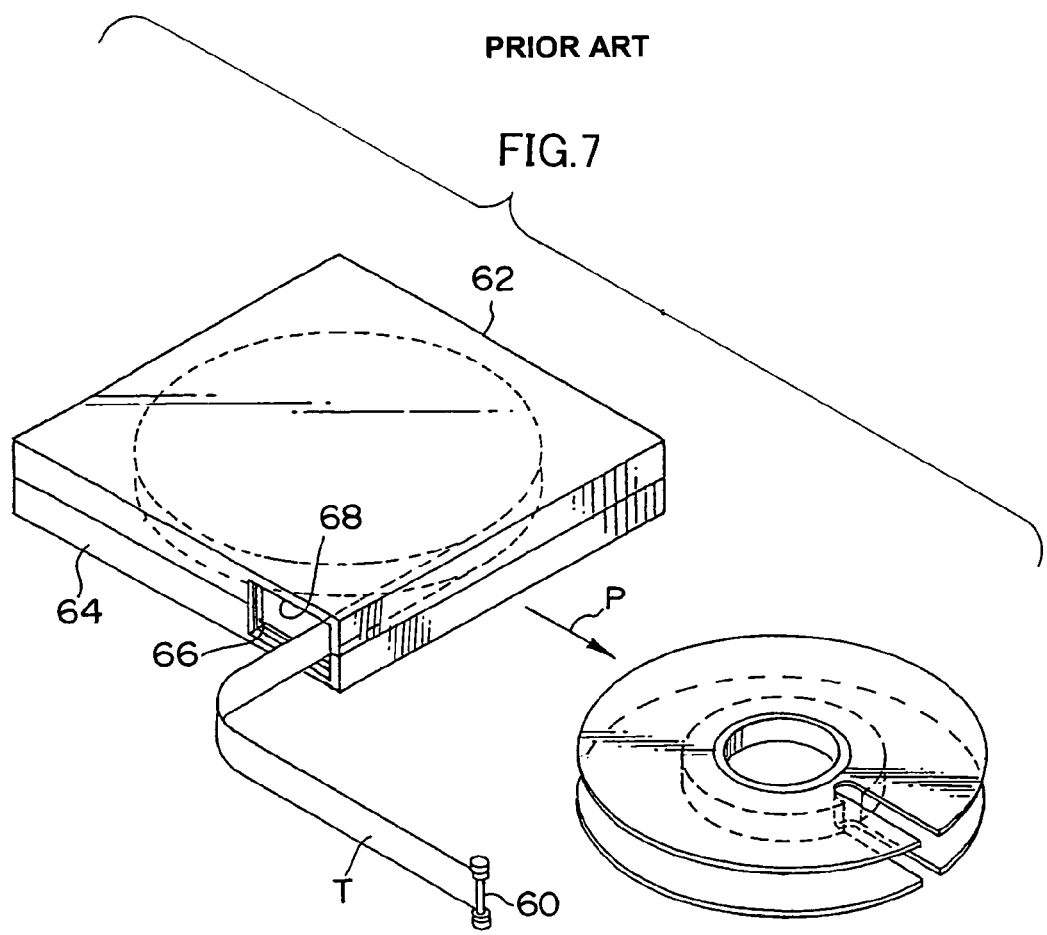
FIG. 7 is a schematic perspective view of a conventional magnetic tape cartridge equipped with a leader pin.
Figure 8:
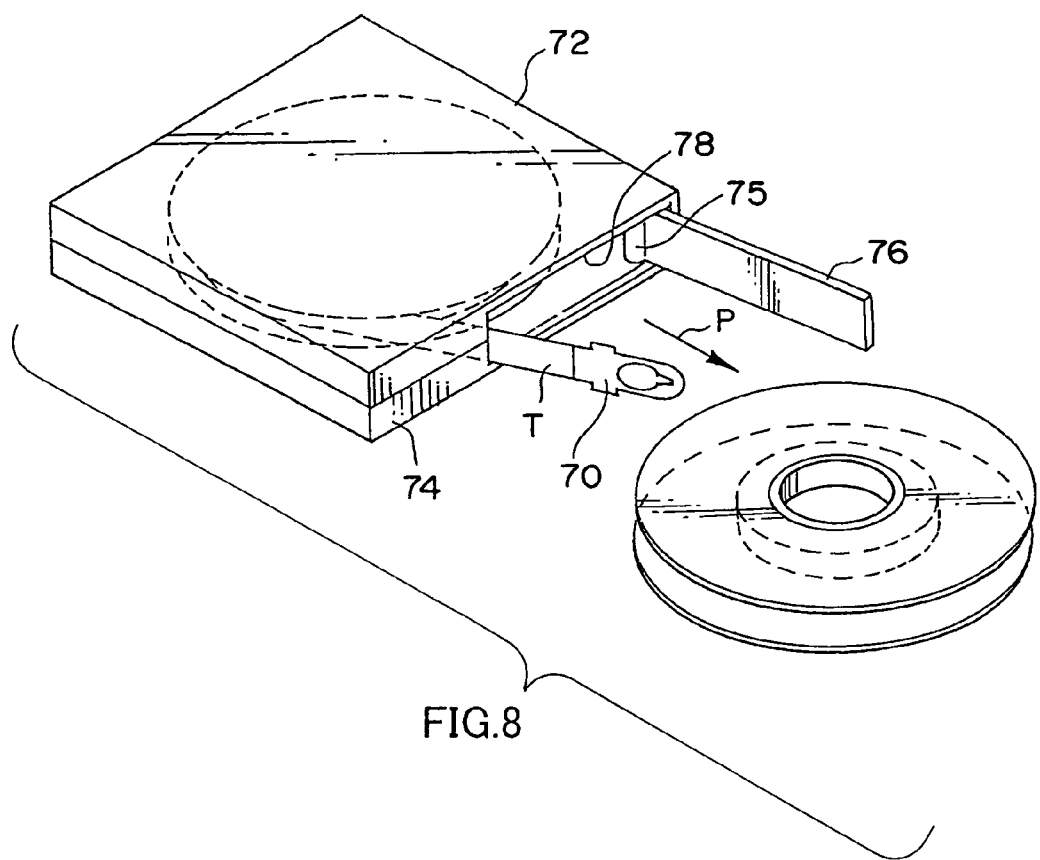
FIG. 8 is a schematic perspective view of a conventional magnetic tape cartridge equipped with a leader tape.

As shown in FIG. 6, the guide wall portions 41, 42 stand erect so as to be perpendicular to the inner ceiling surface of the upper case 16 and the inner bottom surface of the lower case 18. This is in order for the mutually opposing guide surfaces of the guide wall portions 41, 42 to suitably cover and guide the convex portions 51 of the door 50, and is so that the convex portions 51 do not come out of the guide wall portions 41, 42.

Ribs 38, which are substantially trapezoidal in plan view and are integral with the outer sides of the guide wall portions 42 which are exposed from the opening 20, stand erect to the same heights as these guide wall portions 42, at the inner ceiling surface of the upper case 16 and the inner bottom surface of the lower case 18. The strength of the upper case 16 and the lower case 18 at the opening 20 portion is ensured by the ribs 38. Note that the inner sides of the guide wall portions 42 are formed to be continuous with and integral with the pin holding portions 24. The heights of the pin holding portions 24 are preferably substantially equal to or higher than the heights of the guide wall portions 42 which are integral and continuous therewith.

The upper case 16 and the lower case 18, which are as described above, are fixed (joined) together by screws being screwed, from beneath, into the screw bosses 32, 36 which are positioned in vicinities of the edge portions of the opening 20. In this way, the opening 20 is defined (prescribed) by the end portions of the inclined wall portions 30 (the front wall 12A) and the inclined wall portions 34 (the right wall 12B), and the corner portions at both ends of the opening 20 are joined together strongly. Thus, even if the case 12 is dropped, positional offset due to deformation or buckling does not occur. Note that the surfaces of the peripheral walls 16A, 18A which oppose one another (the corner portions at both ends of the opening 20) may be fixed together by welding. However, it is preferable to join the peripheral walls 16A, 18A together by screws, in consideration of the disassembly performance of and the ability to recycle the case 12.

The opening 20 is opened and closed by the door 50 which serves as a shielding member. The plate width (height) of the door 50 at the portion thereof which slides in the guide wall portions 41 and the front halves of the guide wall portions 42 (i.e., at least the portion of the door 50 which closes the opening 20), is formed to be substantially the same as the opening height of the opening 20. The portion of the door further toward the rear thereof is formed to be slightly smaller (shorter). The plate length of the door 50 is formed to be sufficiently longer than the opening width of the opening 20. The door 50 is formed in a substantial arc-shape as seen in plan view which curves along the direction of plate thickness, such that the door 50 can move along a predetermined circumference.

The curved longitudinal dimension of the door 50 is determined such that, in both states in which the door 50 opens and closes the opening 20, the rear end portion of the door 50 is positioned in the right rear corner portion of the case 12, which is further toward the rear than the concave portion 48 (i.e., the right rear corner portion in a vicinity of the concave portion 46). The bottom rear portion of the door 50 is cut obliquely in order to avoid the memory board M which is disposed at an incline at a predetermined angle at the rear portion inner wall 18B of the lower case 18. Note that the inner surface and/or the outer surface at the distal end portion (front end portion) of the door 50 is preferably formed as a tapered surface so as to smoothly enter into the guide wall portions 41.

The convex portions 51 project at the top surface (top edge surface) and the bottom surface (bottom edge surface) of the door 50. The convex portions 51 slide along the guide surfaces of the guide wall portions 41, 42 (the inner side surfaces which oppose one another), and along the inner ceiling surface of the upper case 16 and the inner bottom surface of the lower case 18 between the guide wall portions 41, 42, so as to guide the door 50 in the directions of opening and closing the opening 20. The convex portions 51 are formed in substantial oval shapes as seen in plan view which are long along the longitudinal direction of the door 50. Four convex portions 51 project at each of the top surface and the bottom surface of the door 50 so as to have top/bottom symmetry (except for the convex portions 51 furthest toward the rear), and so as to project to substantially the same heights as the heights of the guide wall portions 41, 42 (e.g., about 0.5 mm at the front side of the boundary portion where the plate width of the door 50 changes, and about 1.5 mm at the rear side of this boundary portion). Note that the convex portions 51 furthest toward the rear do not have top/bottom symmetry because the bottom rear portion of the door 50 is cut obliquely.

The distal ends of the convex portions 51 are formed in substantial arc-shapes in side cross-sectional view (side view). Projections (not illustrated), which are substantially arc-shaped in plan view or substantially triangular in plan view, project at both side surfaces of the convex portion 51 along the entire height of the convex portion 51. Accordingly, when the convex portions 51 are inserted between the guide wall portions 42 and slide, only the substantially arc-shaped distal ends of the convex portions 51 contact the inner ceiling surface of the upper case 16 and the inner bottom surface of the lower case 18, such that there is linear contact thereat. Only the distal ends of the projections, which are substantially arc-shaped or the like, contact the mutually opposing guide surfaces of the guide wall portions 42, such that there is linear contact thereat.

Thus, the sliding resistance (friction) between the top and bottom convex portions 51 and the inner ceiling surface of the upper case 16 and the inner bottom surface of the lower case 18 between the guide wall portions 41 and the guide wall portions 42, and the sliding resistance (friction) between the top and bottom convex portions 51 and the guide surfaces of the guide wall portions 41 and the guide wall portions 42, can be reduced. The door 50 can be slid smoothly with little resistance. Further, when the convex portions 51 are formed in substantially oval shapes as seen in plan view, the impact resistance thereof is better than if they were formed in, for example, substantially circular shapes as seen in plan view. Thus, even if force is applied to the door 50 from a direction other than the opening/closing directions due to the impact of a drop or the like, there is no fear that the convex portions 51 will break. Further, because the guide wall portions 41, 42 stand erect perpendicular to the inner ceiling surface of the upper case 16 and the inner bottom surface of the lower case 18, the projections which project at the both side surfaces of the convex portions 51 are suitably guided by the guide surfaces, and the problem of the convex portions 51 coming out from the guide wall portions 41, 42 does not occur.

The operation projection 52, which serves as an operation portion, projects in the radial direction of the door 50 at the outer peripheral surface of the door 50, slightly further forward than the longitudinal direction central portion of the door 50 (i.e., in a vicinity of the boundary portion where the plate width of the door 50 changes). The operation projection 52 is exposed to the exterior of the case 12 from the slit 40, and is positioned so as to be set apart slightly from the rear ends of the screw bosses 36 when the opening 20 is in a closed state, and can be operated from the portion of the slit 40 which is open toward the front. In the state in which the opening 20 is open, the operation projection 52 is positioned so as to be set apart slightly from the rear edge of the slit 40, and at this time, the convex portions 51 which are positioned the furthest rearward abut the rear end portions of the guide wall portions 42.

Stoppers 58, which abut the upper end portion side surface and the lower end portion side surface of the leader pin 22 when the opening 20 is closed, project at the inner surface of the front end portion of the door 50. The stoppers 58 can even more reliably prevent the leader pin 22 from falling out from the pin holding portions 24 due to impact at the time the recording tape cartridge 10 is dropped or the like. A coil spring 56, which serves as an urging member which urges the door 50 in the direction of closing the opening 20, has a length such that it extends to the rear right corner portion of the case 12 in the state in which the door 50 opens the opening 20. Thus, the space between the play restricting walls 28 and the right wall 12B (the peripheral walls 16A, 18A) at the rear right corner portion can be utilized effectively.

Namely, a spring holding portion 54, which is substantially L-shaped in rear view, projects upwardly and integrally at the inner peripheral surface of the door 50 in the vicinity of the rear end thereof. A solid cylindrical spring anchor portion 55 projects upwardly at the inner surface of the lower case 18 in a vicinity of the concave portion 48. Ring-shaped attachment portions 56A, 56B are formed at the both ends of the coil spring 56. Accordingly, the one attachment portion 56B of the coil spring 56 is placed on the spring anchor portion 55 from above such that the spring anchor portion 55 is inserted through the attachment portion 56B, and the other attachment portion 56A is placed on the spring holding portion 54 from above such that the spring holding portion 54 is inserted through the attachment portion 56A. The coil spring 56 can thereby be attached simply within the aforementioned space.

A rib 57, which the top end of the spring holding portion 54 slidingly contacts at the time when the door 50 is opened and closed, stands erect in a substantial arc-shape in plan view at the upper case 16. The rib 57 is disposed at a position and has a length such that the top end of the holding projection 54 can slidingly contact the rib 57 at least when the door 50 starts to move (open). Due to the rib 57 suitably guiding the spring holding portion 54 which moves against the urging force of the coil spring 56, the door 50 can be opened more stably. Namely, because the rear half of the guide wall portion 42 is formed to be wider than the front half of the guide wall portion 42, the door 50 is restricted at the time of opening so as to not shake due to the urging force of the coil spring 56.

Further, by providing the rib 57, even if the attachment portion 56A of the coil spring 56 rises up along the spring holding portion 54 due to an impact caused by a drop or the like being applied to the case 12, the attachment portion 56A does not come off of the spring holding portion 54. Note that the top end of the spring anchor portion 55 as well is inserted between the play restricting wall 28 and the guide wall portion 42 of the upper case 16. Thus, in the same way, the attachment portion 56B can be prevented from coming off of the spring anchor portion 55.

The door 50 is curved in an arc-shape which corresponds to a predetermined circumference which is the locus of movement of the door 50. In the present embodiment, the center of rotation of the door 50 is set such that the left-right direction position thereof is in a vicinity of the left end of the case 12 and the front-back direction position thereof is in a vicinity of the rear end of the slit 40. In this way, the locus of movement of the door 50 comes closest to the right wall 12B of the case 12 in a vicinity of the rear end of the slit 40. The interval (groove width) of the rear side of the guide wall portion 42 (the rear side when this region is considered to be a border) is formed to be wider than the interval (groove width) of the guide wall portion 42 at the front side. Thus, there are no problems even if there is dispersion in the curvature of the door 50 due to molding.

Note that the center of rotation and the radius of the door 50 may be appropriately determined in accordance with the positions of the front and rear edge portions of the opening 20 (the inclined wall portions 30 and the screw bosses 36) which are determined in accordance with requirements of drive devices, or the angle of the plane of opening of the opening 20 which is determined in accordance with requirements of library devices, or the like. In addition, the interior and the exterior of the case 12 communicate via the slit 40 for exposing the operation projection 52. However, the adhesion of dust and the like to the magnetic tape T wound on the reel 14 is prevented by the play restricting walls 28 serving as inner walls, and by the slit 40 always being substantially closed by the screw bosses 36 and the door 50 (which extends over substantially the entire height of the interior of the case 12).

Next, operation of the present embodiment will be described. When the recording tape cartridge 10 having the above-described structure is not being used (i.e., is being stored, is being transported, or the like), the opening 20 is closed by the door 50. Specifically, due to the urging force of the coil spring 56, the door 50 is always urged in the direction of closing the opening 20, and closes the opening 20 in a state in which the distal end portion (front end portion) of the door 50 has entered in the guide wall portions 41 which are in a vicinity of the inclined wall portions 30.

On the other hand, when the magnetic tape T is to be used, the recording tape cartridge 10 is loaded into a drive device along the direction of arrow A. Accompanying this loading, an opening/closing member (not illustrated), which serves as an opening/closing mechanism of the drive device, enters into the slit 40 which opens toward the front, and engages with the operation projection 52 of the door 50. In this state, when the recording tape cartridge 10 (the case 12) is pushed in further due to the pushing-in force, the opening/closing member moves the operation projection 52 rearward against the urging force of the coil spring 56 (i.e., moves the operation projection 52 rearward relative to the case 12 which is loaded in the direction of arrow A).

Then, while the convex portions 51 are guided by the guide wall portions 42 and the spring holding portion 54 is guided by the rib 57, the door 50, from which the operation projection 52 projects, rotates clockwise as seen in plan view along the direction of curving of the door 50. Namely, due to the guide wall portions 42, the door 50 moves substantially rearward so as to circle around the outer sides of the pin holding portions 24 and the reel 14 without jutting out from the locus of movement along the curved configuration of the door 50, and opens the opening 20. Then, when the case 12 (the recording tape cartridge 10) is loaded to a predetermined depth in the drive device, the opening 20 is completely opened.

When the recording tape cartridge 10 is positioned within the drive device in this state in which the opening 20 is opened, further rotation (substantially rearward movement) of the door 50 is restricted. The pull-out mechanism of the drive device enters into the case 12 from the opening 20 which has been opened. The pull-out mechanism pulls-out the leader pin 22 which is positioned and held at the pin holding portions 24, and accommodates the leader pin 22 at an unillustrated take-up reel. Due to the take-up reel and the reel 14 being driven to rotate synchronously, the magnetic tape T is successively pulled-out from the case 12 while being taken-up onto the take-up reel. Information is recorded or played back by a recording/playback head or the like disposed along the predetermined tape path.

On the other hand, when the magnetic tape T is rewound onto the reel 14 and the recording tape cartridge 10 is to be ejected from the drive device, the positioned state of the recording tape cartridge 10 is released, and the recording tape cartridge 10 is moved in the direction opposite to the direction of arrow A by an unillustrated ejecting mechanism. Then, the door 50 is rotated in the direction of closing the opening 20 by the urging force of the coil spring 56, while the convex portions 51 are guided by the guide wall portions 42. Due to the distal end portion of the door 50 entering into the guide wall portions 41, the opening 20 is completely closed and returned to its initial state.

Here, the opening 20 is formed by cutting off a loading side right front corner portion of the rectangular case 12. Thus, the plane of opening of the opening 20 is directed in the direction of arrow A and the direction of arrow B (the plane of opening is inclined with respect to the direction of arrow A). Accordingly, the pull-out mechanism of the drive device can access the leader pin 22 from the direction of arrow A, the direction of arrow B, or between the direction of arrow A and the direction of arrow B, and engage with the leader pin 22. Thus, in the drive device, the path for pulling-out the magnetic tape T can be made to be the shortest.

Namely, by making the region over which the leader pin 22 can be engaged broad, the area over which the pin holding portions 24 can be set is broad, and the positions where the pin holding portions 24 are disposed can be set in accordance with the specifications of a drive device which engages from the direction of arrow A. Thus, the degrees of freedom in designing the drive device and the recording tape cartridge 10 can be increased. Moreover, because there is no need for a mechanism for making the pull-out mechanism circle around, the drive device can be made more compact and less expensive. In addition, because the path for pulling-out the magnetic tape T is made to be the shortest, the path along which the magnetic tape T travels also is short as a matter of course. Therefore, the contact wear of the magnetic tape T and a tape guide (e.g., a roller which is rotatably supported or the like) can be decreased.

The door 50, which is curved in an arc-shape, opens and closes the opening 20 by rotating so as to circle around the outer sides of the reel 14 and the pin holding portions 24 (the leader pin 22), without jutting out from the locus of movement which runs along the curved configuration of the door 50 (a locus which runs substantially along the outer peripheral portion of the reel 14). Thus, a structure which conserves on space can be formed, the space within the case 12 can be utilized effectively, the space for accommodating the recording tape cartridge 10 within the drive device can be made small, the drive device can be made compact, and the space within the drive device can be used effectively.

The opening 20 can be made to be large by the door 50. Namely, the center of rotation of the door 50 for opening and closing the opening 20 whose plane of opening is inclined with respect to the direction of arrow A, can be determined independently of the axially central position of the reel 14. Thus, the angle of inclination of the plane of opening of the opening 20 with respect to the direction of arrow A, the size of the opening 20 (the distance between the front and rear edge portions thereof, and the like can be set arbitrarily, and it is possible to obtain the door 50 which opens and closes the opening 20 of an arbitrary configuration and arbitrary dimensions corresponding to the requirements of drive devices and the like. Namely, with a structure having the door 50, the degrees of freedom in designing the opening 20 (the recording tape cartridge 10) are increased.

It suffices for the opening/closing member (not illustrated) of the drive device to be disposed and fixed so as to be able to merely enter into the slit 40 from the front and engage with the operation projection 52 of the door 50. The structure is therefore simple. Moreover, because the door 50 closes the opening 20 due to the urging force of the coil spring 56, there is no need at the drive device for a mechanism for driving the door 50 in the direction of closing the opening 20. The structure of the opening/closing mechanism of the drive device can be made to be even more simple.

In this way, the recording tape cartridge 10 relating to the present embodiment has the opening 20 which is structured such that the path along which the magnetic tape T is pulled out is the shortest. Thus, the space for accommodating the recording tape cartridge 10 within the drive device can be made small, and the door 50 can open and close without interfering with the reel 14 and the leader pin 22. Moreover, the opening/closing mechanism (including the opening/closing member) for operating the door 50 so as to open and close the opening 20 can be made to have a simple structure.

The door 50 opens and closes the opening 20 by the convex portions 51, which are substantially oval in plan view, moving in a state of being supported between the guide wall portions 41, 42 which stand erect at the inner surfaces of the case 12, and not in grooves which are formed in a recessed manner in the inner surfaces of the case 12. Thus, the rigidity of the case 12 does not deteriorate. Moreover, the intervals (groove widths) of the guide wall portions 41, 42 narrow continuously or in a stepwise manner along the direction in which the door 50 closes the opening 20 (the guide wall portions 41, 42 widen continuously or in a stepwise manner along the direction in which the door 50 opens the opening 20). Thus, even if there is dispersion in the curvature of the door 50 due to molding, the convex portions 51 of the door 50 can be reliably inserted in the guide wall portions 41, 42.

When the door 50 closes the opening 20, the convex portions 51 can be held tightly by the guide wall portions 41 and the front end sides of the guide wall portions 42. Thus, joggling of the door 50 can be suppressed. Moreover, because the guide wall portions 41, 42 stand erect perpendicularly to the inner ceiling surface of the upper case 16 and the inner bottom surface of the lower case 18, the problem of the convex portions 51 coming out of the guide wall portions 41, 42 does not arise.

As described above, in accordance with the present invention, the opening is formed by cutting off a corner portion of the case at the side in the direction of loading the case into a drive device. Thus, the plane of opening of the opening can be made to face the drive device, and a pull-out mechanism of the drive device can enter in from the front side, and the path along which the recording tape is pulled out can be made to be the shortest. Accordingly, the drive device does not require a complex mechanism for making the recording tape circle around, and it is possible to design a drive device which is compact and has a low manufacturing cost.

The guide grooves which guide the shielding member are provided at the inner surfaces of the case so as to narrow along the direction in which the shielding member closes the opening, or in other words, so as to widen along the direction in which the shielding member opens the opening. Thus, even if there is dispersion in the curvature of the shielding member (which is formed in a substantial arc-shape in plan view) due to molding, the shielding member can be reliably assembled in the case. Further, because the guide grooves are formed to become more narrow along the direction in which the shielding member closes the opening, joggling of the shielding member at the time when the shielding member closes the opening is suppressed.

What is claimed is:

1. A recording tape cartridge which is loaded into a drive device from a predetermined loading direction for use, the recording tape cartridge comprising:

a case rotatably accommodating a single reel on which a recording tape is wound, the case having a front wall at a front side thereof in the loading direction and a side wall running along the loading direction, and having a corner portion between the front wall and the side wall, an opening for pulling-out of the recording tape from one end portion of the recording tape being formed at said corner portion; and a shielding member, disposed within the case so as to be slidable along a predetermined locus, for opening and closing the opening by sliding, wherein the predetermined locus is formed by a groove being formed at an interior of the case, and at least one portion of the shielding member is positioned and guided in the groove, wherein the groove has at least two portions having different widths, and a portion of the groove which is at a downstream side in a direction in which the shielding member closes the opening has a groove width which is more narrow than a portion of the groove which is at an upstream side.

2. The recording tape cartridge of claim 1, wherein said corner portion has a surface which is inclined with respect to both the front wall and the side wall, and the opening is formed at said surface.

3. The recording tape cartridge of claim 1, wherein the case has an upper plate and a lower plate, each of which is substantially rectangular and has an inner surface, and the case has wall portions including the front wall and the slide wall, which wall portions join together the upper plate and the lower plate such that a space for accommodating the reel is formed between the inner surfaces of the upper plate and the lower plate, and the opening is formed in the wall portions of the upper plate and the lower plate, which wall portions are associated with one corner.

4. The recording tape cartridge of claim 1, wherein the recording tape has a leader member which is attached to an end portion of the recording tape and which is pulled-out to the drive device.

5. The recording tape cartridge of claim 1, wherein the shielding member has an opening/closing plate which is curved in a substantial arc-shape having one radius.

6. The recording tape cartridge of claim 5, wherein the opening/closing plate has, in a direction of sliding, at least two portions having different widths, and, among the portions, a portion which is close to the opening has a wider width than a portion which is far from the opening.

7. The recording tape cartridge of claim 5, wherein a portion of the opening/closing plate, which portion is positioned at the opening when the opening is closed by the opening/closing plate, has substantially a same width as the opening.

8. The recording tape cartridge of claim 5, wherein the predetermined locus is a substantial arc-shape having one radius, and a radius of the opening/closing plate substantially coincides with the radius of the predetermined locus.

9. The recording tape cartridge of claim 1, wherein the predetermined locus is a substantial arc-shape having one radius.

10. The recording tape cartridge of claim 1, wherein a slit, which is continuous with the opening and extends parallel to the loading direction, is formed in the side wall, and the shielding member has a projecting portion which is exposed from the slit and which can be moved parallel to the loading direction along the slit.

11. The recording tape cartridge of claim 1, wherein the case has an upper plate and a lower plate, each of which is substantially rectangular and has an inner surface, and opposing walls which project substantially vertically are formed at the inner surfaces of the upper plate and the lower plate, and at least one portion of the groove is formed by the opposing walls.

12. The recording tape cartridge of claim 11, wherein the recording tape has a leader member which is attached to an end portion of the recording tape and which is pulled-out to the drive device, and a concave portion for holding the leader member is formed at an interior of the case in a vicinity of the opening, and one of the walls are formed to be continuous with the concave portion.

13. The recording tape cartridge of claim 1, wherein the groove has a portion whose width changes continuously along the predetermined locus.

14. The recording tape cartridge of claim 1, wherein the groove has a portion whose width changes in a stepwise manner along the predetermined locus.

* * * * *